United States Patent [19]

Peterson et al.

[11] Patent Number: 5,174,340
[45] Date of Patent: Dec. 29, 1992

[54] APPARATUS FOR PREVENTING CASING DAMAGE DUE TO FORMATION COMPACTION

[75] Inventors: James L. Peterson, Gretna; Romulo Gonzalez, Slidell, both of La.

[73] Assignee: Shell Oil Company, Houston, Tex.

[21] Appl. No.: 633,897

[22] Filed: Dec. 26, 1990

[51] Int. Cl.⁵ .............................................. F16L 9/02
[52] U.S. Cl. .................................. 138/110; 138/121; 138/122; 138/173; 138/119; 166/242
[58] Field of Search .............. 138/118, 121, 122, 173, 138/110, 119; 285/301; 166/250, 242

[56] References Cited

U.S. PATENT DOCUMENTS

| | | | |
|---|---|---|---|
| 1,786,506 | 12/1930 | Ray | 285/300 |
| 1,864,861 | 6/1932 | Schaller | 138/121 |
| 1,896,112 | 2/1933 | Simmons | 166/242 |
| 2,886,885 | 5/1959 | Reid | 138/121 |
| 2,911,238 | 11/1959 | Myers et al. | 285/301 |
| 3,019,820 | 2/1962 | Yowell et al. | 138/121 |
| 3,120,268 | 2/1964 | Caldwell | 138/121 |
| 3,143,146 | 8/1964 | Kennedy | 138/121 |
| 3,263,446 | 8/1966 | Wiggins | 138/121 |
| 3,580,334 | 5/1971 | Broussard | 166/250 |
| 3,725,565 | 4/1973 | Schmidt | 138/121 |
| 3,837,685 | 9/1974 | Miller | 285/300 |
| 4,854,611 | 8/1989 | Press | 285/301 |
| 5,026,209 | 6/1991 | Titmas et al. | 166/242 |

FOREIGN PATENT DOCUMENTS

| | | | |
|---|---|---|---|
| 727761 | 10/1942 | Fed. Rep. of Germany | 138/121 |
| 3603481 | 8/1987 | Fed. Rep. of Germany | 138/173 |

Primary Examiner—James E. Bryant, III

[57] ABSTRACT

A method and apparatus for preventing casing damage due to high axial loading in a well as a result of compaction of the surrounding earth formations. The method consists of providing specially sized and located grooves on both the inside and outside diameters of a section of well casing. The grooves are designed and spacers may be used in some grooves to ensure symmetrical deformation of the casing when subjected to a compressive loading.

8 Claims, 3 Drawing Sheets

APPARATUS FOR PREVENTING CASING DAMAGE DUE TO FORMATION COMPACTION

BACKGROUND OF THE INVENTION

The present invention relates to a special section of well casing that is particularly useful in offshore wells that have under-compacted formations. As hydrocarbon production has moved into deeper waters off-shore, the producing formations have often been younger, under-compacted reservoirs. As these reservoirs are produced, they compact which results in axial loading and casing deformation. In many cases, the deformation of the casing has been extensive enough to cause loss of the producing wells. Since offshore production is typically from a structure having limited space, the loss of a well can seriously affect the total production from the structure. Well replacement is typically difficult, if at all possible, and always results in significant additional expense. When conditions preclude well replacement, the hydrocarbon reserves are lost forever.

One obvious solution to the problem of casing damage caused by axial load due to formation compaction would be to provide some sort of slip joint in the casing that would allow the casing to shorten without damage such as buckling or collapsing. While the slip joint would solve the problem of buckled or collapsed casing, it requires seals or other means for isolating the formation from the interior of the casing.

In addition, if slip joints are used as part of a well casing, some means must be provided for preventing the slip joint from collapsing as the casing is installed in the well. In addition to preventing the slip joint from collapsing, structure must be included for preventing it from extending beyond its limits as the casing is hung free in the well. Both of these requirements involve complicated mechanical arrangements that are, of course, subject to failure in a well. Obviously, if the slip joint compresses during installation of the casing, it will not provide protection against casing collapse when the reservoir compacts.

SUMMARY OF THE INVENTION

The present invention solves the problem of casing damage due to axial load from formation compaction by providing a special casing joint which can compress or shorten as the formation compacts. The special casing section is also provided with means to limit its elongation so that it will not be unduly extended as the casing is installed in the well. While the elongation of the special casing section is limited, it is provided with unlimited compression or shortening ability within its designed limits. The shortening of each casing section is limited but practically any desired shortening can be obtained by using multiple lengths of the special casing section. In particular, the invention provides for a finite shortening per unit length of the special casing section. Thus, when additional provision must be made for shortening of the casing section as a result of compaction of the reservoir, one may provide additional lengths of the special casing section. In particular, the invention allows axial shortening of the casing string without unacceptable radial deformation and without requiring the seals that would be necessary in the case of a slip joint.

The special casing section can be visualized as a bellows or accordian that permits shortening of its overall length in response to axial load. It can best be described as a piece of casing or thick-walled tubular product that has grooves machined on both its outside and inside diameters. The grooves are of a particular shape and are located at precise axial distances from each other. Further, the number of grooves on the outside diameter is the same as the grooves on the inner diameter. The grooves typically have a U-shaped cross section in which the depth and axial location of the U's as well as their depth in relation to the thickness of the casing wall is closely controlled. In particular, the depth of the grooves is controlled so that an overlap occurs between the grooves formed on the inner diameter and those formed on the outer diameter. These dimensions are controlled so that when the special casing section is subjected to an axial load as occurs when the formation surrounding the casing compacts, the U-shaped grooves will close. The special casing section is designed so that the ends of the grooves adjacent the inner or outer surface of the casing close and convert the U-shaped groove into a teardrop-shaped groove.

The dimensions of the grooves are also controlled in relation to the material from which the special casing section is formed to ensure that the grooves, when collapsed, will form a teardrop section. This is necessary to ensure that the special casing section does not buckle or otherwise deform because the grooves failed to close. In some cases, a protective sleeve is placed around the special casing section and is designed to provide the strength required to prevent lateral buckling of the special casing section when the axial load is applied. In addition, the outer sleeve also protects the grooves and keeps them clear of cement or formation material as the special casing section is installed in the well. Obviously, if the grooves on the outer diameter became clogged with cement or formation material, it could interfere with the functioning of the tool. The protective sleeve also limits axial extension due to high axial tension load when the casing is being installed in the well.

BRIEF DESCRIPTION OF THE DRAWINGS

The present invention will be more easily understood from the following detailed description of a preferred embodiment when taken in conjunction with the attached drawings in which.

DESCRIPTION OF THE PREFERRED EMBODIMENT

Figure 1:
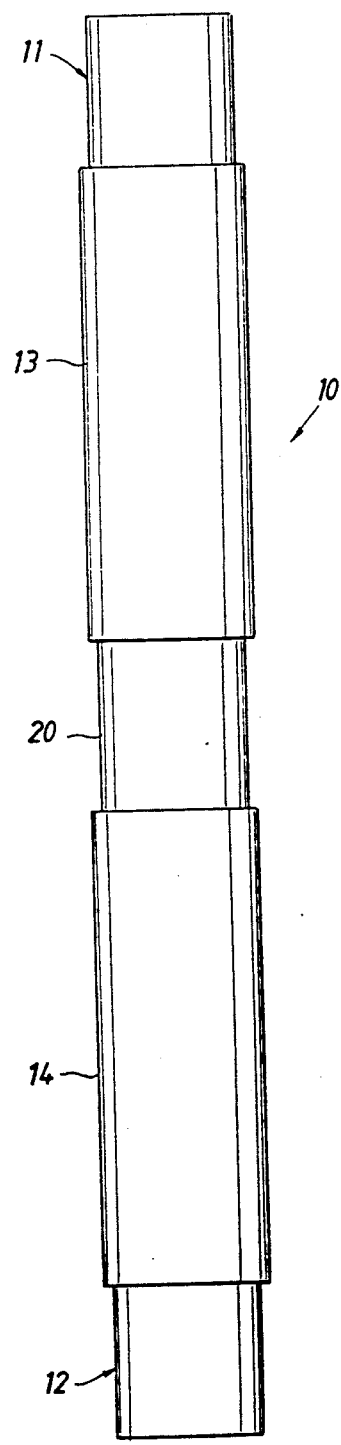
FIG. 1 is an elevation view of the complete special casing section.

In FIG. 1 there is shown an elevation view of the special well casing assembly 10. The special casing assembly is provided with tubular connections 11 and 12 at each end that can be used to join the special casing to the conventional well casing or to additional special casing assemblies. In the unit shown in FIG. 1, two separate sections of grooves are provided with the grooves being covered by protective sleeves 13 and 14.

Figure 2:
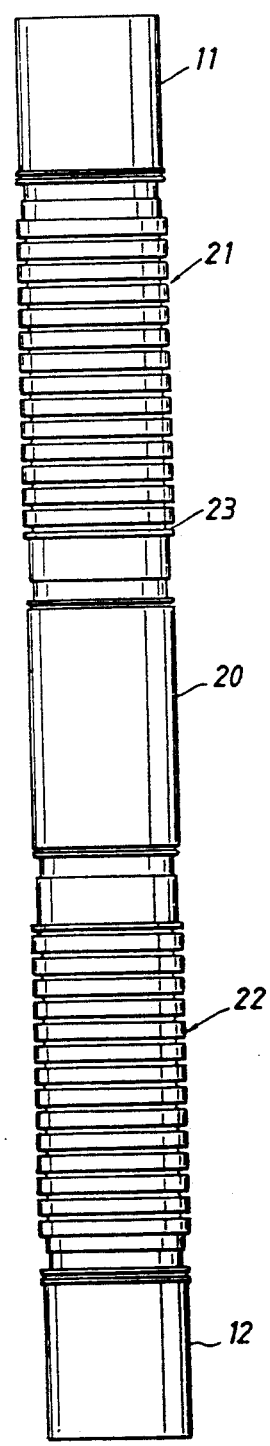
FIG. 2 is an elevation view of the special casing section shown in FIG. 1 with the outer protective sleeves removed.

In FIG. 2, there is shown the details of the casing section of the assembly shown in FIG. 1. Casing section 20 is provided with a series of grooves 23 on its outer surface at two separate locations 21 and 22. These separate sections of grooves are used on the casing 20 to provide maximum amount of axial shortening in a given length of the casing 20. Obviously, the amount that the casing 20 can be shortened by compression will depend upon the number and size of grooves provided. It is necessary to provide two separate sections of grooves because only a limited number of grooves can be formed on the interior diameter of the casing 20. The number of interior grooves is limited by difficulty of machining the interior grooves at a great depth within the casing. It is obvious that if a larger diameter casing were used, the forming of the grooves on the interior diameter of the casing would be simplified and in some instances, it may be possible to combine the two sections of grooves, 21 and 22, in a single group of grooves or provide a continuous series of grooves on the interior of casing 20.

Figure 3:
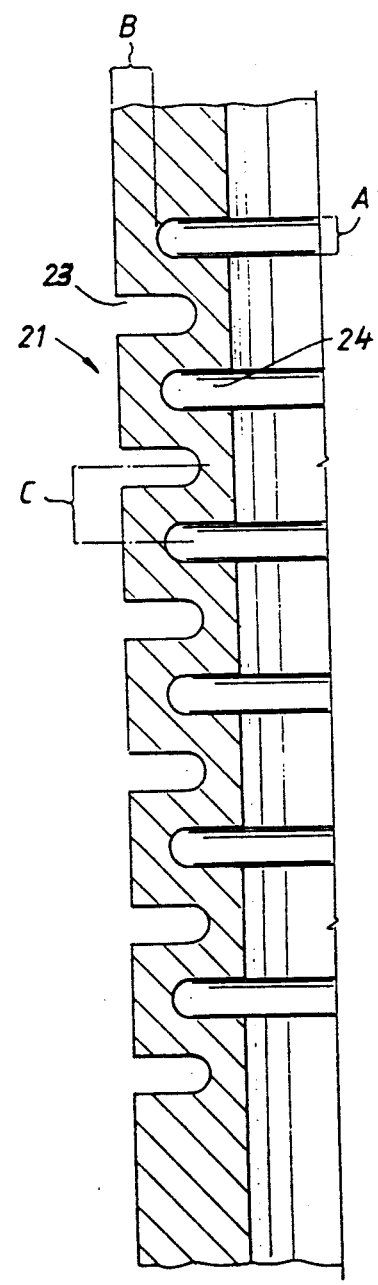
FIG. 3 is an enlarged cross section of the grooves shown in the special casing section of FIG. 2.

Referring to FIG. 3, there is shown an enlarged cross section of some of the exterior and interior grooves formed on the casing section 20 of FIG. 2. In particular, the exterior grooves 23 formed on the outer surface are equally spaced between the interior grooves 24 and when the uppermost groove is formed on the inner surface, then it is desirable that the lowermost groove be formed on the outer surface as shown in FIG. 3. The uppermost and lowermost grooves maybe located either on outer or inner surfaces and regardless of their positions, the uppermost and lowermost grooves will collapse only approximately one-half the distance of the remaining grooves. It should be noted that while 14 grooves are shown on the outer surface of the casing 20 of FIG. 2, only 6 are shown in FIG. 3 due to the enlarged scale of the drawing of FIG. 3.

Obviously, grooves of different dimensions and different spacings may be used with the width and number of the grooves depending upon the total desired shortening of the casing section. The geometry of the grooves and the material used in the casing control the load required to shorten the casing. In the case of $7\frac{1}{4}''$ well casing having a wall thickness of 11/16ths of an inch and formed of 85,000 psi minimum specified yield strength steel, grooves having the following dimensions provide excellent results when the casing is subjected to axial load. The width A of the grooves is 0.250 inches while the groove has a depth which leaves a wall thickness B at the bottom of 0.188 inches and the spacing C between the center line of grooves on the inner surface and those on the outer surface is 0.500 inches. Using these dimensions and providing a near perfect semicircle at the bottom of the groove as shown in FIG. 3, the grooves will have a radial overlap between the maximum depth of the inner groove and those of the outer groove of approximately 0.313 inches. While grooves having parallel sides are preferred for ease of manufacturing, V-shaped grooves having a circular bottom could also be used. Further, the uppermost and lowermost grooves can both be located on either the outer or inner diameters in place of an equal number of grooves on the inner and outer diameters as shown.

The foregoing dimensions can be varied to vary some of the characteristics of special casing section. For example, to increase the collapse strength one can increase the spacing "C" between the grooves. As an alternative, the wall thickness B could be increased to increase the collapse strength of the casing.

Figure 4:
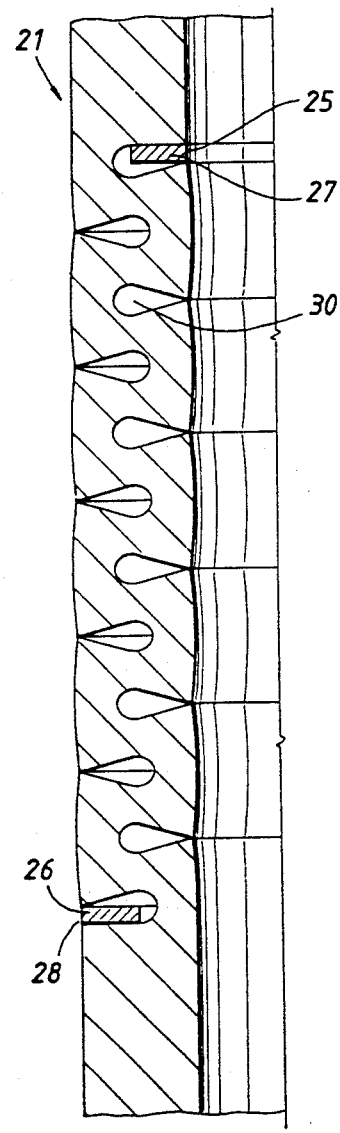
FIG. 4 is a cross section of the grooves shown in FIG. 3 shown in a collapsed configuration.

Referring to FIG. 4, there is shown a section of the casing of FIG. 3 in a fully collapsed or shortened condition. As shown, the uppermost groove 25 on the inner surface is provided with a spacer 27 while the lowermost groove 28 on the outer surface is provided with a similar spacer 26. The spacers 27 and 26 have a thickness equal to one-half of the groove width to limit the closure of the upper and lowermost grooves to one-half the width of the groove. While it is preferable to use spacers 27 and 26 in the end grooves, tests have shown that the spacers can be eliminated and the casing will collapse uniformly under an axial load. In contrast, the remainder of the grooves can completely close until the outer edges of the groove touch to form a teardrop-shaped closed section 30 as shown in FIG. 4 with slight bulges forming on the inner and outer surfaces as shown.

Figure 5:
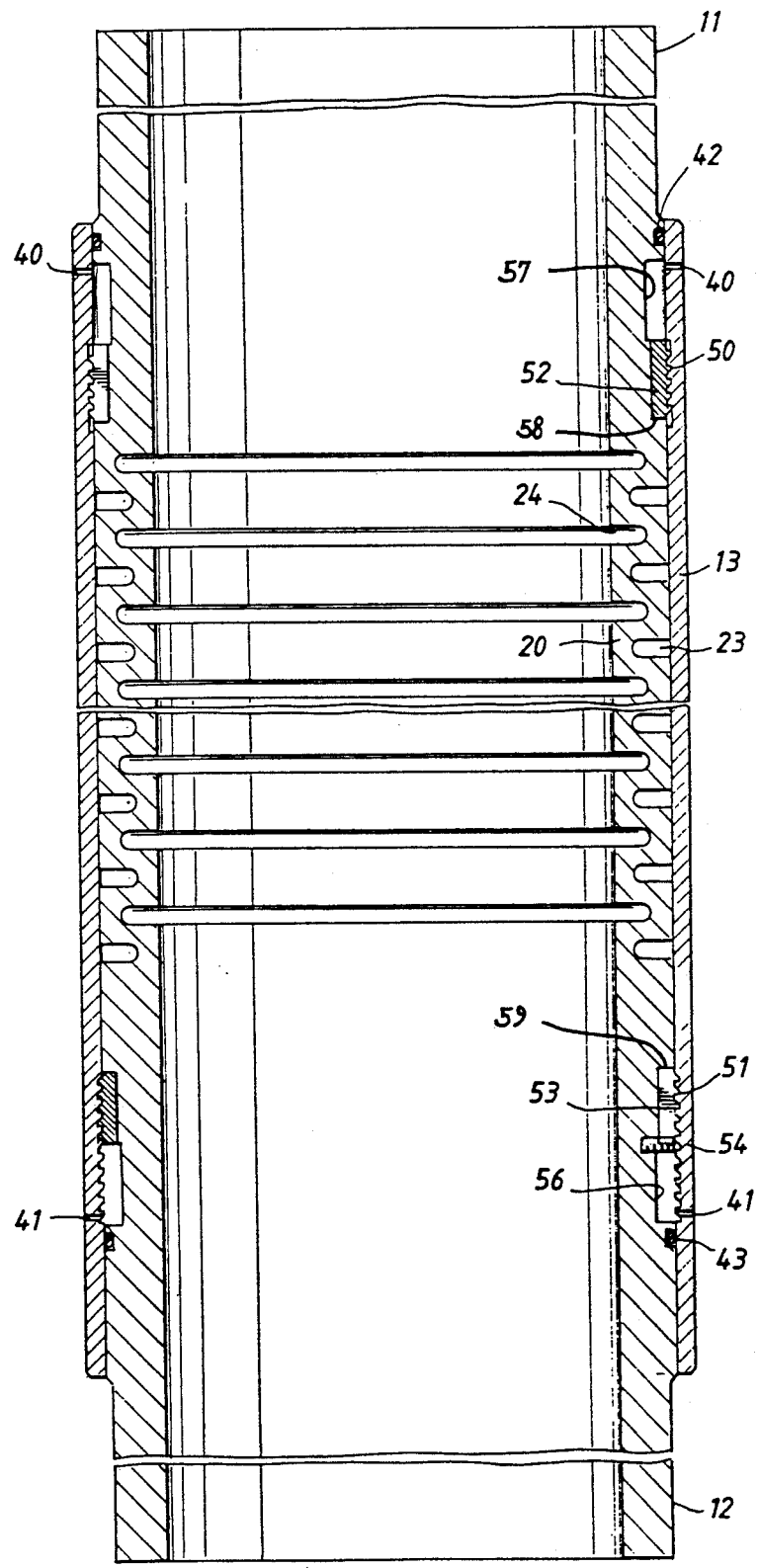
FIG. 5 is a cross section of one portion of the casing shown in FIG. 1 with the protective sleeve installed.

Referring to FIG. 5, there is shown a cross section of the special casing shown in FIG. 1 with the protective sleeve 13 installed. Only the upper portion of the special casing shown in FIG. 5 is shown and the lower portion containing the protective sleeve 14 in the second set of grooves is omitted in the illustration. The protective sleeve 13 is provided with a vent hole 40 near its upper edge and a vent hole 41 near its lower edge. The vent holes serve to equalize the pressure between the interior of the sleeve and the exterior as the special casing section is installed in the well. In addition, the holes can be used for filling the void between the casing and protective sleeve with oil or grease. If the void is filled, the lower vent hole 41 should be closed with a threaded plug and the upper vent hole 40 sealed with a deformable plug that will move to allow the pressure to equalize. O-ring seals 42 and 43 are provided at the upper and the lower ends of the protective sleeve to exclude borehole debris from the interior of the sleeve and to allow pumping the cavity full of oil or grease.

The protective sleeve is secured to the casing section 20 by grooved and threaded rings at its upper and lower ends respectively. The upper connection is formed by annular grooves 50 on the interior surface of the sleeve and a C-ring shaped grooved section 52 that is secured to the casing section 20. The threaded connection at the lower end is formed by threads 51 on the inner surface of the sleeve and the threaded C-ring 53. It should be noted that the grooves and threads are modified buttress-type with the inclined surfaces of the buttress facing each other as shown in FIG. 5. The lower threaded C-ring is held in position and prevented from turning by a set screw 54 which passes through a slot between the end of the ring and threads into the wall of the casing section 20 while the upper grooved C-ring 53 is free to rotate. This allows the lower ring to be threaded onto the outer sleeve and the sleeve to slide upwardly as explained below.

The sleeve is assembled on the exterior of the casing 20 by first installing the upper C-ring 52 on the exterior surface of the casing 20. The sleeve can then be slid over the bottom of the casing section 20. As the sleeve is moved upward the C-ring 52 will slide up until it is aligned with recess 57 at which point it will be forced into the recess by the sleeve and the sleeve will ratchet over the ring. The sleeve is raised further until the lower end of the sleeve clears the recess 56. The C-ring 53 can then be installed in the recess 56 and the ends of the C-ring positioned so that the set screw 54 can be installed. The sleeve can then be lowered along the casing 20 by sliding the sleeve over the C-ring 53 until both C-rings are aligned with grooves 50 and threads 51. The sleeve can then be rotated relative to the body. As the sleeve is threaded onto the C-ring 53, the C-ring 52 will contact shoulder 58 and C-ring 53 will contact shoulder 59 as shown in FIG. 5.

While the casing cannot stretch as it is installed, the compression or shortening of the casing section is limited only by the number of grooves 23 and 24 and their width. As the casing section 20 collapses or shortens by the closing of the grooves 23 and 24, the lower C-ring 53 will slide down the outer surface of the casing section 20. Once the C-ring 53 aligns with the recess section 56, the sleeve will slide over the threads on the C-ring 53 and allow the casing to be shortened until the grooves completely close as shown in FIG. 4. The similar action occurs at the top C-ring.

Figure 6:
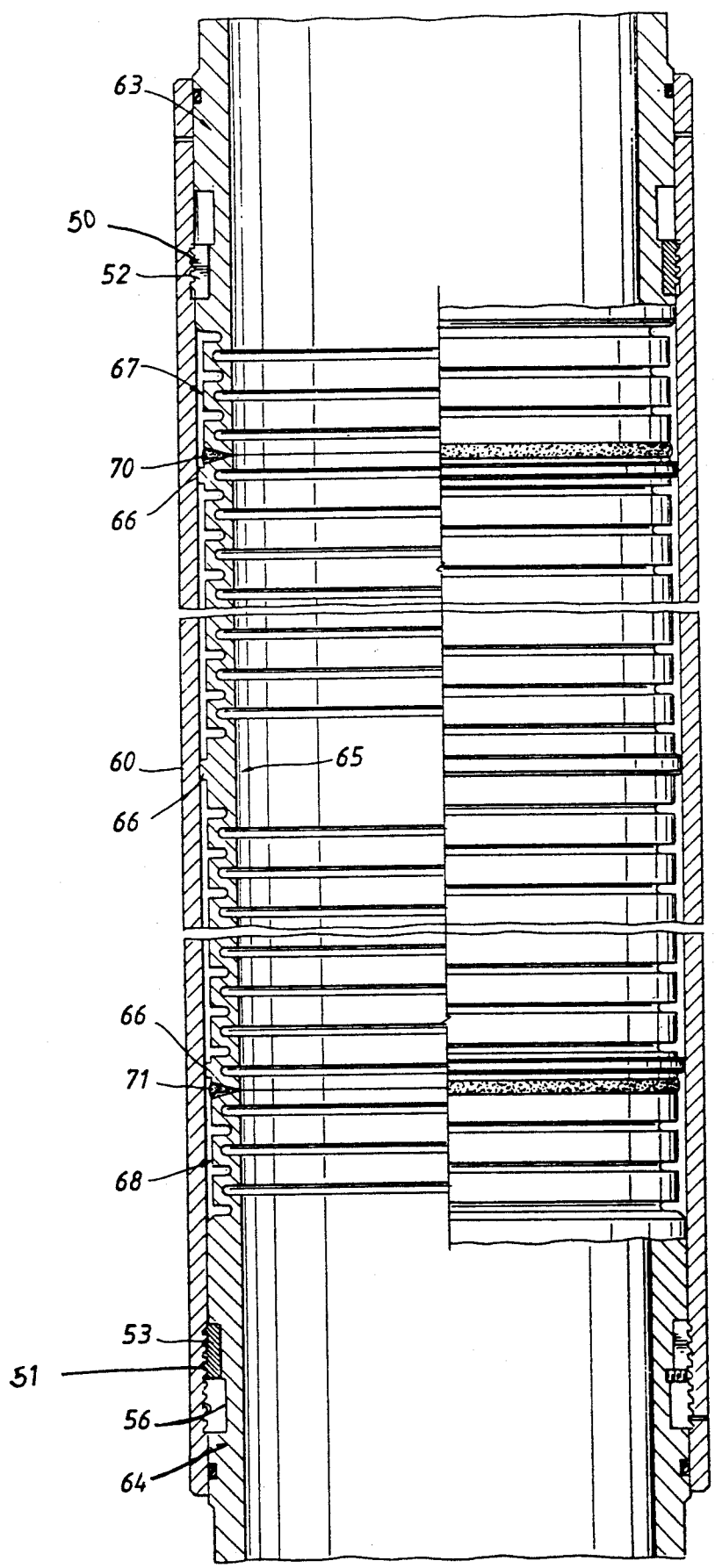
FIG. 6 is a modified form of the casing shown in FIG. 1 shown half in elevation and half in section.

FIG. 6 illustrates a modified form of the special casing section that is easier to manufacture while providing a means for obtaining any desired axial shortening in a single casing section. The modified casing has two end sections 63 and 64 that are joined to a center section 65 by welds 70 and 71. Obviously, as many center sections as needed can be used to provide any desired axial shortening. The center section may be provided with annular flanges 66 having rounded corners. The flanges 66 stabilize the special casing and help ensure that the grooves will close and the casing shorten under an axial load without buckling. The flanges 66 slide on the inner surface of the modified protective sleeve 60. The modified sleeve 60 is the same as sleeve 13 except it is longer to accommodate the increased length of the special casing. The sleeve 60 is attached to the special casing using the same grooved ring 52 and threaded ring 53 as described above and illustrated in FIG. 5.

The modified casing is assembled in the same manner as described above and illustrated in FIG. 5. It should be noted that the end sections 63 and 64 are provided with larger outer diameter sections at their ends. This provides the wall thickness required for the ring and thread arrangement used to secure the protective sleeve to the casing section. The use of larger diameter sections at the ends of sections 63 and 64 allows the use of thinner walled sections where the grooves are formed. This configuration facilitates the manufacture of the sleeve by allowing the use of a constant diameter for the sleeve and still provide clearance between the sleeve and the casing section. This also produces stiff end sections and optimum grooved sections and uniform axial shortening of the casing section under axial load.

From the above description it can be readily appreciated that this invention has provided a special casing section which can shorten a designed amount thus minimizing the axial load and prevent buckling or collapsing. In addition, provisions are made for limiting the elongation of the special casing section so that the casing can be installed as a portion of the regular well casing and hung in a well without danger of the casing elongating to an extent that would cause parting of the casing. The use of the protective sleeve on the outer surface of the casing serves the dual purpose of providing strength to the casing to prevent its lateral buckling or otherwise deforming and to exclude formation debris from the grooves formed on the outer surface of the special casing. The protective sleeve also carries a portion of the axial load when the casing is being installed in a well and hanging free in the well. The grooves formed on the interior surface of the casing can be filled with a deformable plastic to exclude debris from these grooves. The deformable plastic will be extruded from the grooves when the casing is subject to a compression load.

The protective sleeve can be eliminated when the weight of the casing suspended below the special casing does not exceed its design limits and the special casing is laterally supported by the cement.

What is claimed is:

1. A special well casing section, said casing section comprising:
   (a) a section of tubular well casing and
   (b) a means allowing axial loading of said well casing without buckling said well casing, said means comprising
   (i) a plurality of first annular grooves, said first grooves being formed on the outer surface of said well casing, said first grooves being equally spaced;
   (ii) a plurality of second annular grooves, said second grooves being formed on the inner surface of said well casing, said second grooves being equally spaced between said first grooves; and
   (iii) said first and second grooves having substantially identical U-shaped cross sections, the depth of said first and second grooves being sufficient to allow the bottom of said grooves to overlap and the axial spacing between adjacent first and second grooves being substantially equal to substantially twice the width of said grooves and the width of the grooves being such that as axial loading occurs, ends of the U-shaped grooves substantially close and convert the U-shaped grooves into teardrop-shaped grooves.

2. The casing section of claim 1 and in addition, a protective sleeve, said sleeve surrounding at least the portion of the outer surface of said well casing containing said first grooves, said protective sleeve being attached to said well casing in a manner to permit limited elongation and shortening of the well casing to the extent required to allow said first and second grooves to close until the outer edges of each groove are in contact.

3. The casing section of claim 2 wherein the protective sleeve is attached to the well casing by a system comprising:
   a series of threads formed on the inner surface of the protective sleeve at one end and a third series of annular grooves formed on the inner surface of the protective sleeve at the other end;
   a series of threads positioned on one end of said well casing beyond the location of said first and second annular grooves and a fourth series of annular grooves positioned on the other end of said well casing beyond said first and second annular grooves, said fourth series of annular grooves being constructed and positioned on said well casing to permit said protective sleeve to be installed on said well casing by sliding the end of the protective sleeve containing said third series of annular grooves over said threads on said well casing and over the section of the well casing containing said first and second series of annular grooves until the threads on said protective sleeve contact the threads on the well casing and then threading the protective sleeve onto the well casing.

4. The casing of claim 3 wherein the threads on the well casing comprise a separate "C" shaped ring member positioned in a recess formed on the outer surface of the well casing.

5. The casing of claim 4 wherein the fourth series of annular grooves on the well casing comprise a second separate "C" shaped ring member positioned in a recess formed on the outer surface of the well casing.

6. The casing of claim 5 wherein the axial length of the recesses allows said "C" shaped rings to be forced into said recesses.

7. The casing of claim 6 wherein all of said threads and third series of annular grooves on said protective sleeve and the threads and annular grooves on said first and second "C" shaped ring have a modified buttress cross section with the buttress side of the thread and annular grooves on each of said "C" shaped rings projecting in opposite directions.

8. The casing of claim 7 wherein the buttress side of the thread on said "C" shaped rings projects in a direction that permits at least the third series of annular grooves on the protective sleeve to move relative to the second C-ring when said second C-ring section is moved to a position on the well casing having a diameter that is less than the diameter of the recess.

* * * * *